United States Patent
Wnuk et al.

(10) Patent No.: US 7,210,584 B2
(45) Date of Patent: May 1, 2007

(54) FILTER DEVICE, IN PARTICULAR FOR HIGH-PRESSURE APPLICATIONS IN A MOLTEN POLYMER FILTRATION

(75) Inventors: Ralf Wnuk, Bexbach (DE); Jürgen Hausdorf, Otterstadt (DE); Thomas Schorn, St. Ingbert (DE); Otto Sandmeyer, Blieskastel (DE); Norbert Lang, Blieskastel (DE)

(73) Assignee: Hydac Process Technology GmbH, Neunkirchen (DE)

( * ) Notice: Subject to any disclaimer, the term of this patent is extended or adjusted under 35 U.S.C. 154(b) by 295 days.

(21) Appl. No.: 10/486,685

(22) PCT Filed: Aug. 24, 2002

(86) PCT No.: PCT/EP02/09501

§ 371 (c)(1),
(2), (4) Date: Feb. 13, 2004

(87) PCT Pub. No.: WO03/020396

PCT Pub. Date: Mar. 13, 2003

(65) Prior Publication Data

US 2004/0188345 A1 Sep. 30, 2004

(30) Foreign Application Priority Data

Aug. 28, 2001 (DE) ................ 101 41 992

(51) Int. Cl.
*B01D 29/13* (2006.01)
*B01D 29/00* (2006.01)
*B01D 29/11* (2006.01)
*B01D 29/15* (2006.01)

(52) U.S. Cl. ............ 210/484; 210/232; 210/237; 210/437; 210/457; 210/485; 210/488; 210/497.01; 210/498; 210/499

(58) Field of Classification Search ........... 210/232, 210/237, 323.2, 346, 359, 436, 437, 457, 210/470, 484, 485, 488, 489, 493.1, 497.01, 210/498, 499; 425/199
See application file for complete search history.

(56) References Cited

U.S. PATENT DOCUMENTS 4,661,249 A * 4/1987 Langley ............... 210/266

(Continued)

FOREIGN PATENT DOCUMENTS

DE 3326288 A1 1/1985

(Continued)

*Primary Examiner*—John Kim
(74) *Attorney, Agent, or Firm*—Roylance, Abrams, Berdo & Goodman, L.L.P.

(57) ABSTRACT

A filter device, in particular, for high-pressure applications in a molten polymer filtration, has a screw-in piece (10), provided with a first threaded section (12) for fixing the filter device, and a second threaded section (14) for fixing a filter medium (16), in particular, in the form of a metal wool and with a perforated support tube (18) for the metal wool. The other free end of the filter device is provided with a volume displacer (24). The metal wool is surrounded by a support grid (20) and fixed by two fixing pieces (28, 30), held at a separation from each other by the support grid (20). One fixing piece (28) is fixed to the second threaded section (14) of the screw-in piece (10). The other fixing piece forms a handle (30) for the fixing formed. As a result of the volume displacer (24) being a one-piece component of the support tube (18) and the fixing piece (30) forming the handle covering the volume displacer (24), the filter device is significantly improved in that a simple and rapid assembly procedure for the exchangeable filter medium is provided. Also, the filter element construction is held formed to be free of damaging torsional loads.

15 Claims, 2 Drawing Sheets

U.S. PATENT DOCUMENTS 4,812,235 A * 3/1989 Seleman et al. ............ 210/247
6,579,348 B1 * 6/2003 Winter et al. ................. 95/273

FOREIGN PATENT DOCUMENTS

WO    WO 99/00434 A1    1/1990
WO    WO 01/52966 A1    7/2001

* cited by examiner

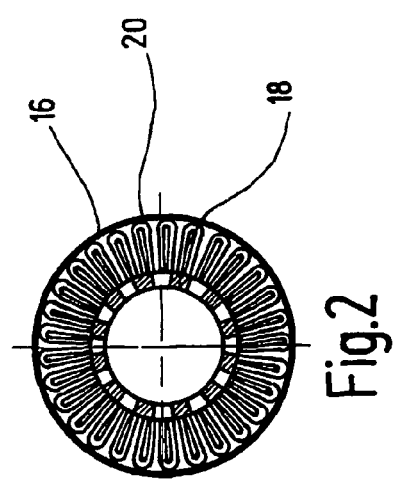
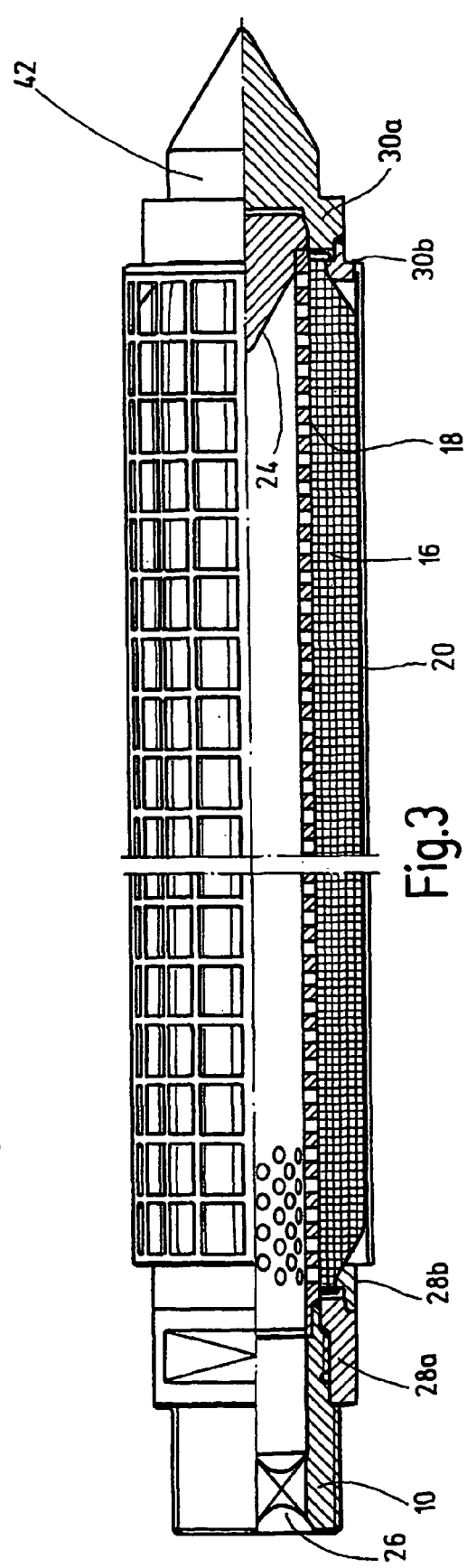

FILTER DEVICE, IN PARTICULAR FOR HIGH-PRESSURE APPLICATIONS IN A MOLTEN POLYMER FILTRATION

FIELD OF THE INVENTION

The present invention relates to a filter device, in particular, for high-pressure applications in a molten polymer filtration, having a screw-in component provided with a first threaded section for fixing the filter device and a second threaded section for fixing a filter medium, in particular, in the form of metal wool. The metal wool has a perforated supporting tube. The other free end of the filter device is provided with a volume displacement component. The metal wool is enclosed in a support grid and retained by two fixing components spaced a certain distance from each other by the support grid and fixed on the second threaded section of the screw-in component. One fixing component forms a handle.

BACKGROUND OF THE INVENTION

WO 90/00434 discloses an annular flange between the first and second threaded section of the screw-in component. An annular seal may be supported on the annular flange and brought into contact by its other annular surface with the screw-on fixing component of the filter medium. The fixing component is provided on its outer circumference with setscrews positioned diametrically opposite each other to facilitate the screw-on process. The opposite side of the filter medium is fixed to a second fixing component. The second fixing component also has on its outer circumference screw-in openings positioned diametrically opposite each other for applying a fixing tool, so that it is possible to use the fixing tool and the auxiliary fixing means in the form of the setscrews to carry out a screw-on application process potentially free of torsion. In this way, the filter medium, in particular, one in the form of metal wool, is kept free of torsional stresses for later polymer melt filtration, and avoids damaging the support grid enclosing the metal wool filter medium to shield it from the exterior. The volume displacement component is then screwed onto this fixing component in the direction of the supporting tube. While this disclosed solution does make it possible to replace a fouled filter medium with a new filter element having fixing components and to leave the valuable stainless steel components in the form of the screw-in component and the supporting tube at the place of assembly, the assembly process itself is difficult to carry out because of insufficient rigidity of the filter element structure which complicates the replacement process. The possibility of buildup of torsional stresses in the support grid and in the filter medium in the fixing processes, make failure possible, especially in a high-pressure application.

DE 43 43 270 A1 discloses a spinning head for spinning polymer melts, having an upper element and a nozzle block housing with a nozzle plate having a maximum area of 90 $cm^2$ and a melt channel with filter cartridge. As disclosed, a single filter cartridge is mounted upstream in the direction of flow from each nozzle plate. The filter cartridge has a seamless wire cloth cylinder through which flow proceeds radially from the exterior toward the interior. The cylinder has a cap at the upper end and a connecting piece tapering downward through which melt is conducted at the lower end. The zone of the melt channel receiving the filter cartridge is configured as a cone, at least in the lower third. The tapering connecting piece of the filter cartridge is pressed into the cone by the polymer melt so as to be self-sealing. Uniform flow of the polymer melt with dead spaces eliminated is achieved to the greatest extent possible. A volume displacement component, which is a one-piece component of a supporting tube for the filter medium, is provided at the upper end of the filter cartridge, opposite the lower end of the cone referred to. Despite the resulting reinforcement of the system as a whole, susceptibility to torsional stresses is still present. On the whole, the process of filter element replacement is accomplished only with difficulty. Virtually complete disassembly of the disclosed spinning head is required for the purpose.

WO 01/52966 A1 discloses a filter device with a filter housing having a filter admission and filter discharge, as well as a filter element dividing a filter chamber into two component chambers. Since one component chamber narrows in cross-section from the filter admission toward the filter discharge, a conical configuration of at least one of the two component chambers separated by the filter element is provided. This configuration permits achievement of optimal dwell time distribution inside the filter device, along with a uniform rate of flow, a characteristic which performs an essential function, especially in the case of high-viscosity fluids such as polymer melts. A fixing component configured as a handle encircles the volume displacement component in the interior. Since the filter medium surrounding the supporting tube rests on the fixing component and at the opposite end in receptacle components is rigidly connected to the housing, the harmful torsional stresses described also arise in a process of disassembly and replacement of the filter element. Replacement of the filter elements also entails high cost.

SUMMARY OF THE INVENTION

Objects of the present invention are to provide an improved filter device permitting simple and rapid assembly of the filter medium to be replaced, as well as keeping the filter element design free of harmful stresses, especially ones in the form of torsional stresses.

These objects are basically attained with a filter device where the volume displacement component is an integral component of the supporting tube and the fixing component configured as a handle encircles the volume displacement component. Consequently, the volume displacement component as a component of the supporting tube no longer diminishes the operating cross-section for the fixing component configured as handle. This fixing component is then reinforced as a sealing or cover component to the extent that a rigid structure is achieved for the filter element as a whole as replacement modular unit. Thus, torsional forces harmful to the filter medium in the fixing or screw-on process may be largely prevented. A screw-in cartridge of stable configuration is obtained. The costly volume displacement component may remain in the supporting tube in a replacement process and need not be removed in a detailed process. The solution of the present invention also makes it possible to carry out the fixing and exchange process exclusively by the handle, so that additional auxiliary assembly components such as setscrews or the like may be entirely omitted on the other fixing component with the threaded section.

In one preferred embodiment of the filter device of the present invention provision is also made such that, when the screw-in component has been introduced, an annular seal, in particular, one in the form of a metal wool seal, is mounted between the first and the second threaded section of the fixing component. A separate annular seal on an annular flange of the screw-in component, provided in conventional designs, may be completely omitted. Yet, reliable sealing is thereby achieved.

In another, especially preferred, embodiment of the filter device of the present invention, the filter medium is retained by projections of material, especially also by indentations of the fixing components, at specified fixing points. The fixing points preferably represent an integral component of the fixing components. The respective configuration provides for a torsion-free fixing and replacement process for the filter medium, so that this medium is kept largely free of harmful material stresses.

In another preferred embodiment of the filter device of the present invention, the fixing component serving as handle has the filter device spaced a certain distance axially from the volume displacement component. This volume displacement component is provided with sloping support surfaces which are at least to some extent in contact with supporting surfaces of the handle when a fixing component has been screwed in. The respective configuration, with the volume displacement component resting on the handle, provides security of contact making certain that the threading of the fixing component to be screwed on will not be screwed on too tightly, a condition which could damage the threading. Contact is also established such that the metal wool as filter medium, together with its support grid, is not subjected to harmful torsional forces.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 2 is an end elevational view in section taken along line I–I in FIG. 1; and FIG. 3 is a diagrammatic (not to scale) side elevational view, partially in section, of a filter device according to a second embodiment of the present invention.

DETAILED DESCRIPTION OF THE INVENTION

Figure 1:
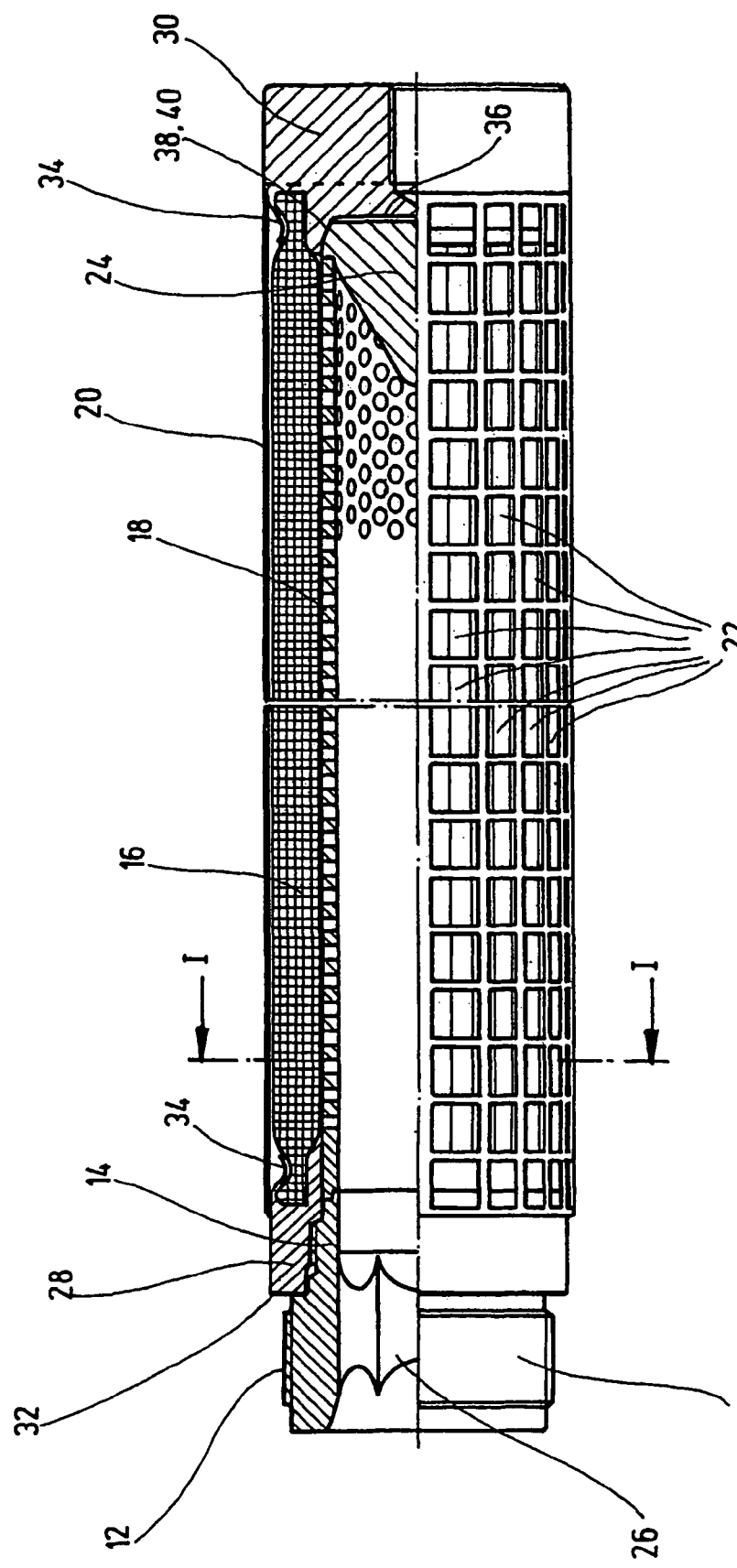
FIG. 1 is a diagrammatic (not to scale) side elevational view of a filter device, partly in section, according to a first embodiment of the present invention.

The filter device according to the present invention in the first embodiment shown in FIGS. 1 and 2 is explained first. The second embodiment will then be presented, but only to the extent that it differs essentially from the first embodiment.

The filter device is provided, in particular, for high-pressure use in polymer melt filtration. The filter device has a screw-in component 10 for fixing the filter device in an overall filter module (not shown) and having a first threaded section 12. The screw-in component 10 also has a second, downstream, threaded section 14 for fixing a filter medium 16, in this instance a metal wool suitable for polymer melt filtration. In the interior, the filter medium 16 rests on a perforated supporting tube 18. On the outside, the metal wool or filter medium 16 is enclosed in a support grid 20 with rectangular passage areas 22. The supporting tube 18 is rigidly connected on one of its ends to screw-in component 10, especially by a welded connection. On its other free end, the supporting tube is connected to a volume displacement component 24, particularly by a welded seam. The volume displacement component 24 is engaged by its tapering fluid conducting component in the supporting tube 18, and thus, serves to even out the polymer melt flow inside the supporting tube in the direction of the discharge opening 26 inside the screw-in component 10.

Both the support grid 20 and the filter medium 16 are retained on two fixing components 28, 30 kept at the specified distance between them, in particular, by the filter medium 16. The first fixing component 28 secures the filter medium 16 on the second threaded section 14 of the screw-in component 10. The second fixing component 30 is provided as a handle for the fixing process involved. The overall structure of fixing components 28, 30, with support grid 20 and filter medium 16, is accordingly configured so that a process of screwing in and unscrewing of the respective filter unit is made possible essentially by engagement of the handle in the form of the second fixing component 30. The direction provided for passage of the polymer melt, especially at high pressure values, extends from the exterior toward the interior, initially by the support grid 20, then by the filter medium 16 and perforations in the supporting tube 18 to the interior of the filter device. The polymer melt then leaves the filter device by the discharge opening 26 for subsequent use after impurities have been removed from it in this manner. If the metal wool is added as filter medium 16 removing impurities, the possibility accordingly exists of making a new filter medium available for repeated use by the handle 30, by detaching the screw-in component 10 by the first fixing component 28. Since the second fixing component 30 more or less encloses the volume displacement component 24, the handle may be designed to be highly rigid, a condition favoring the overall rigidity for the replacement components. Harmful torsional stresses, especially those arising in the fixing process, may be kept away from the filter medium with its support grid 20.

An annular seal 32 is mounted between the first threaded section 12 and the second threaded section 14 of the screw-in component 10. Annular seal 32 is on the free frontal surface of the first fixing component 28 after this component has been introduced, in particular, a seal in the form of a metal wool seal. This arrangement presents the advantage that the filter element, which has only one seal, is kept replaceable and yet reliable sealing of the interior of the filter device from the surroundings is provided in this way during later use. Unintended escape of the polymer melt is accordingly reliably prevented, even in decidedly high-pressure applications.

The filter medium 16 is retained in specific fixing positions in recesses in the fixing components 28, 30 by projections of material, in particular, in the embodiment shown in FIG. 1. The inherently flexible metal wool as filter medium 16 may thus be fixed to the projections of material 34 by pressing processes. This fixing technique may be cost effectively applied, and yet permits reliable fixing. The fixing positions referred to are themselves integral components of the fixing components 28, 30. The respective fixing position continues as an extension in the fixing component 28, 30. The latter also promotes the overall reinforcement of the system. As shown in FIG. 2, in particular, the filter medium 16 extends in pleated form around the supporting tube 18, and is enclosed toward the exterior by the support grid 20.

The second fixing component 30 serving as handle is spaced a certain distance 36 in the axial direction of the filter device from the volume displacement component 24. The volume displacement component 24 is provided with tapering support areas 38 which are at least to some extent in contact with support surfaces 40 of the second fixing component after the first fixing component has been introduced. A supporting force may thus be exerted on the volume displacement component 24 during the screw-in process. The volume displacement component 24 may then also serve as a backing to prevent excessive tightening on the threaded sections in the area of the first fixing component 28. In addition, forces arising during filtration may then be reliably diverted by the support areas 38, 40 into the base structure of the supporting tube 18 with screw-in component 10. The latter also contributes to reinforcement of the system as a whole, so as to provide the possibility of shielding the filter medium 16 itself from the effects of harmful forces.

The second embodiment is described in detail with reference to FIG. 3. The same reference numbers are employed as those used for the first embodiment. The second embodiment will accordingly be explained only to the extent that it differs from the first embodiment illustrated in FIGS. 1 and 2.

First of all, in the second embodiment shown in FIG. 3, the fixing component 30 serving as handle is provided with a tapered element 42 extending outward toward the exterior. In addition to fixing of the filter device by the screw-in component 10, the tapered element 42 also provides the option of fixing inside an overall filter device (not shown), in addition to that of fixing the filter device by the screw-in component 10. In addition, each of the first and second fixing component 28, 30 has two sections 28a,b, 30a,b, each of the respective sections being rigidly connected to each other by a weld seam. The respective section 28b, 30b has a corbel projecting inward. The filter medium 16 is thickened by a built-up weld seam so that the weld seam overlaps the section so that the filter medium 16 may be fixed on the sections 28b, 30b. This arrangement provides a very slim overall filter device in which the support grid 20 more or less determines the outer diameter of the overall filter device.

Both embodiments have in common the feature that the screw-in component 10 forms with the supporting tube 18 and the volume displacement component 24 a module present on an overall filter unit and that the filter medium 16 with its two fixing components 28, 30, which is subject to wear, is separable as replacement module from the fixed module. If the filter device is used for filtration of polymer melts, all essential structural components are made of stainless steel materials.

While various embodiments have been chosen to illustrate the invention, it will be understood by those skilled in the art that various changes and modifications can be made therein without departing from the scope of the invention as defined in the appended claims.

What is claimed is:

1. A filter device, comprising:
    a first module including a screw-in component with a first threaded section for mounting the filter device and with a second threaded section, including a perforated supporting tube fixedly attached to and extending from said screw-in component at a first axial end of said supporting tube, and including volume displacement component fixedly attached to said supporting tube at to a second axial thereof to form an integral component end of said supporting tube; and
    a second module including a metal wool filter medium, including a support grid enclosing said filter medium and including first and second fixing components retaining and fixed to said support grid and said filter medium and spaced from one another by said support grid and said filter medium, said first fixing component being threadedly coupled to said second threaded section of said screw-in component, said second fixing component forming a handle for manipulating the filter device and encircling said volume displacement component, said filter medium encompassing and being supported on an interior thereof by said support tube.

2. A filter device according to claim 1 wherein the filter device is for high pressure applications in molten polymer filtration.

3. A filter device according to claim 1 wherein an annular seal is mounted between said first and second threaded sections of said screw-in component and on a free frontal surface of said first fixing component.

4. A filter device according to claim 3 wherein said annular seal is a metal wool seal.

5. A filter device according to claim 1 wherein said fixing components have projections retaining said filter medium thereto.

6. A filter device according to claim 5 wherein said fixing components comprise recesses receiving said filter medium to retain said filter medium with said projections.

7. A filter device according to claim 5 wherein each said projection is an integral extension of the respective fixing component.

8. A filter device according to claim 1 wherein said second fixing component is spaced a certain distance in an axial direction of the filter device from said volume displacement component; and
said volume displacement component comprises tapering support areas at least partially in contact with said second fixing component.

9. A filter device according to claim 8 wherein said second fixing component comprises a tapered element engaging said tapering support areas.

10. A filter device according to claim 5 wherein said first fixing component comprises first and second interconnected sections, said first interconnected section having a thread engaging said second threaded section, said second interconnected section having said projection thereof.

11. A filter device according to claim 10 wherein said first and second interconnection sections are fixed to one another by a weld seam.

12. A filter device according to claim 1 wherein said first module is a lasting structural unit; and
said second module is a replacement unit subject to wear.

13. A filter device according to claim 1 wherein said first and second modules are formed of stainless steel materials.

14. A filter device according to claim 1 wherein said second fixing component laterally surrounds and directly engages said volume displacement component.

15. A filter device according to claim 14 wherein said second fixing component and said volume displacement component have mating tapering support areas that engage one another.

* * * * *